3,578,708
METAL SEQUESTRANT
Ronald H. Carlson, Lewiston, N.Y., assignor to Hooker
  Chemical Corporation, Niagara Falls, N.Y.
No Drawing. Filed Nov. 2, 1967, Ser. No. 680,040
    Int. Cl. C07c *101/26;* C07f *9/50;* C11d *3/36*
U.S. Cl. 260—534                              12 Claims

ABSTRACT OF THE DISCLOSURE

This invention relates to novel compounds useful as a sequestrant, and as a stabilizer for hydrogen peroxide, against contaminating catalyst ions such as cupric, ferric and manganous ions which cause decomposition of hydrogen peroxide for example.

Although the novel compounds included within this invention are of broad scope, representative compounds include: hexasodium tris(N,N-diacetatoaminomethyl)phosphine; trisodium tris(N-acetatoaminomethyl)phosphine; tris(N,N - diacetoaminomethyl)phosphine; tetrasodium mono(hydroxymethyl)bis(N,N - diacetatoaminomethyl) phosphine; and disodium bis(hydroxymethyl)N,N-diacetatoaminomethyl phosphine.

---

This invention relates to a novel sequestrant, the use thereof, and the processes of making.

BACKGROUND

The use of complexing agents which combine with metal ions in solution to form soluble complexes (which agents are commonly referred to as sequestrants) is of great importance in many industrial processes inasmuch as it may prevent undesired precipitation reactions from occurring. For example, sequestration of calcium is important in water treatment and in laundry solutions for controlling hardness of the water. Sequestration of the heavy metals such as copper and nickel is essential in such areas as textile processing and metal cleaning and finishing. Not all sequestrants, however, are equally effective, their activity varying with their structures and the conditions under which they are used; for example, the common carboxylic acid sequestrants are often ineffective in preventing ferric ion precipitation from alkaline solutions of pH greater than 8.

The decomposition of aqueous hydrogen peroxide solutions is catalyzed by dissolved trace metal ions (notably $Cu^{+2}$, $Fe^{+3}$, and $Mn^{+2}$) present in solution. The addition of metal chelating agents to peroxide solutions serves to deactivate these dissolved trace metals and thus reduce their catalytic effect upon peroxide decomposition.

It is an object of this invention to provide a novel compound or mixtures thereof for sequestering metal ions.

Another object of this invention is a method for making the sequestrant.

Another object is a sequestrant superior in effectiveness as compared to prior art sequestrants.

Another object is a process of use of the novel compound, as a sequestrant.

Another object is another process of use of the novel compound, as a highly effective stabilizer of aqueous hydrogen peroxide solution against metal catalyzed decomposition.

Other objects become apparent from the above and following disclosure.

In accordance with this invention, a method of sequestering at least one metal ion in an aqueous solution thereof comprises adding a novel compound to the solution, the novel compound being of the Formula I or II:

(I) 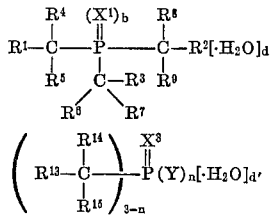

(II) 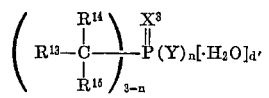

in which Y is a hydroxy or mercaptan group, or an alkali metal salt thereof such as preferably of sodium or potassium, in which $b$ is zero or one, in which $d$ is zero to three, in which $d'$ is zero to two, in which $X^1$ is an oxygen or a sulfur atom, in which $R^1$, $R^2$, and $R^3$ are each selected from the group consisting of (A) hydroxy, (B) an aminocarboxylic group of the Formula III:

(III) 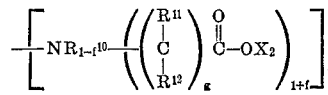

in which $R^{13}$ is said aminocarboxylic group, in which $f$ is zero or one, in which $X^2$ is hydrogen, ammonium (—$NH_4$), or alkali metal such as sodium, potassium and the like, in which $R^4$, $R^6$, $R^8$ and $R^{14}$ are each a member selected from the group consisting of hydrogen, alkyl, alkoxy, hydroxy, aralkyl, aryl, alkylaryl, aryloxy, alkoxyaryl, and said aminocarboxylic group, in which $R^5$, $R^7$, $R^9$ and $R^{15}$ are each selected from the group consisting of said member and hydrogen and in which $R^{10}$, $R^{11}$, and $R^{12}$ are each hydrogen or alkyl; in which $n$ ranges from 1 to 2; in which $g$ ranges from one to about three, preferably one; provided preferably that $R^4$ through $R^9$ members are each a non-hydroxy and non-alkoxy member (1) at least when at least one of $R^4$, $R^5$, $R^6$, $R^7$, $R^8$ and $R^9$ is an alkyl of at least 2 carbons, and (2) at least when $b$ is one and $X^1$ is oxygen; provided that preferably at least one of $R^1$, $R^2$ and $R^3$ is said aminocarboxylic group; provided that $R^1$ is an aminocarboxylic group at least when at least one of $R^4$ and $R^5$ is an alkyl of at least two carbon atoms; provided that $R^2$ is an aminocarboxylic group at least when at least one of $R^6$ and $R^7$ is an alkyl of at least two carbon atoms; provided that $R^3$ is an aminocarboxylic group at least when at least one of $R^8$ and $R^9$ is an alkyl of at least two carbon atoms; provided at least one of $R^4$ through $R^9$ is an aminocarboxylic group at least when one of $R^4$ through $R^9$ is selected from the group consisting of a hydrogen atom and an alkyl substituent; and provided that $X^3$ is sulfur (S) when Y is a mercaptan group (—SH) and that $X^3$ is oxygen (O) when Y is a hydroxy group (—OH).

In a preferred embodiment of this invention, $R^1$, $R^2$, and $R^3$ are each said aminocarboxylic group, and $R^4$ through $R^9$ are each hydrogen.

In a further preferred embodiment, $X^2$ is sodium or potassium.

The alkyl substituents typically include methyl, ethyl, propyl, butyl, hexyl, decyl, and the like.

The alkoxy substituents typically include methoxy, propoxy, pentoxy, dodecyloxy, and the like.

The aralkyl substituents typically include monophenylmethyl, mononaphthyl, diphenylmethyl, and the like.

The aryl substituents typically include phenyl, naphthyl, diphenyl, and the like.

The alkylaryl substituents typically include toluene, 1,4-diethyl phenyl, 3-propyl naphthyl, and the like.

The aryloxy substituents typically include 1-hydroxyphenyl, 1,4-dihydroxy toluene, 5-hydroxynaphthyl, and the like.

The alkoxaryl substituents typically include methoxy, ethoxy, propoxy, decyloxy, and the like, substituted forms of the aryloxy substituents.

Further preferred compounds of this invention include:

(a) hexasodium tris(N,N - diacetatoaminomethyl)phosphine [hereafter designated STDAMP]:

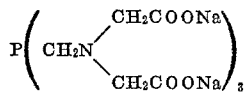

(b) trisodium tris(N - acetatoaminomethyl)phosphine [hereafter designated STAMP]:

(c) tris(N,N - diacetatominomethyl)phosphine [hereafter designated TDAMP]:

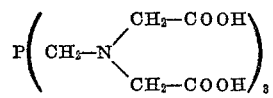

(d) tetrasodium mono(hydroxymethyl)bis(N,N - diacetatoaminomethyl)phosphine [hereafter designated SHMBAMP]:

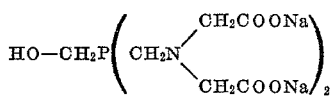

(e) disodium bis(hydroxymethyl)N,N - diacetatoaminomethyl phosphine [hereafter designated SBHMAMP]:

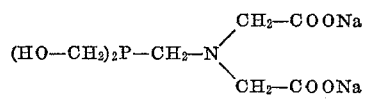

Other illustrative compounds of this invention, in addition to the above preferred compounds, typically includes: hexapotassium tris(N,N-diacetato - 1 - aminoethyl)phosphine; triammonium tris(N - acetatoaminomethyl)phosphine; hexasodium tris(N,N - dipropionato-1-aminoethyl) phosphine oxide; hexasodium tris(N,N-diacetatoaminomethyl) phosphine oxide; tripotassium tris(N-acetatoaminomethyl)phosphine oxide; tetrasodium mono(1-hydroxyethylbis(N,N-diacetatoaminomethyl)phosphine; disodium bis(hydroxymethyl)N - methyl, N-acetatoaminomethyl phosphine, and the like.

The trivalent phosphorus compounds such as the above typical illustration may be converted to the pentavalent state by mild oxidation, such as to the oxide form by a conventional reaction with hydrogen peroxide for example, or such as to the thio state by a conventional reaction with elemental sulfur for example.

The trivalent phosphorus compounds of this invention are in general prepared by reacting a tetrakis(hydroxyalkyl( phosphonium salt (such as tetrakis(hydroxymethyl) acetate, chloride, hydroxide or bromide) with an aminocarboxylic acid of the formula:

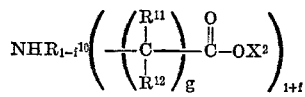

where $R^{10}$, $R^{11}$, $R^{12}$, $X^2$, $f$ and $g$ are each defined above, in the presence of alkali in an amount sufficient to produce a pH at least sufficiently high that said aminocarboxylic acid is substantially comletely ionized. Maximum pH is critically about 12 because pH values above about pH 12 promote oxidation of the tetrakis(hydroxyalkyl) phosphonium salt to the non-reactive tris(hydroxyalkyl) phosphine oxide. Preferred pH ranges from about pH 10.5 to about pH 11.5. A pH value below critically about 10 promotes protonation of the amino acid, whereby the reaction of the process of this invention is substantially terminated. A preferred embodiment which produces optimum yield requires that an aqueous solution of the tetrakis(hydroxyalkyl)phosphonium salt be added and admixed (i.e., metered) substantially simultaneously with the adding and admixing of an alkali (caustic) aqueous solution, to an alkaline solution of the aminocarboxylic acid, whereby the pH of the solution of the aminocarboxylic acid is maintained in the above-discussed critical pH range. The stoichiometry of the reactants and/or the degree to which reaction is carried to completion determines the final product, i.e., determines the degree to which the hydroxy groups are replaced by aminocarboxylic groups.

The trivalent compounds and the pentavalent compounds of this invention may each be employed alone as a sequestrant, or may alternatively be employed in a mixture with each other. Typical reaction mixtures include a composition of STDAMP/SHMBAMP/SBHMAMP/THPO (where THPO is tris(hydroxymethyl)phosphine oxide) in typical amounts of (a) about 45%/47%/7%/1%, or (b) about 35%/50%/6%/9%/, for example. Reaction mixtures of this type may be prepared, for example, by a process such as is illustrated in Example VI below.

Typical prior art commercial sequestrants with which the sequestrant of this invention can be admixed include trisodium nitrilotriacetate [SNTA], tetrasodium ethylenediaminetetraacetate [SEDTA], disodium iminodiacetate [SIDA], trisodium hydroxyethylethylene diaminetriacetate [SHEDTA], pentasodium diethylenetriaminepentaacetate [SDTPA], pentasodium nitrilotrimethylenephosphonate [SNTMP], gluconic acid, sodium tripolyphosphate [STPP], and the like.

The compounds and mixtures thereof, of this invention, are substantially insoluble in organic solvents such as alcohol, chlorinated hydrocarbon, and inert organic solvents such as hexane, for example.

Some of the typical metals whose ions may be sequestered by the compounds of this invention include iron, aluminum, copper, nickel, chromium, tin, lead, gadolinium, europium, neodymium, and the like.

The above compounds of this invention are suitable additionally for other uses, for example in detergents, in metal cleaning baths, in dye solutions, to stabilize peroxide solutions, and the like.

The compounds of this invention normally may be used as sequestrants in solutions wherein the pH ranges from about 1 to about 14. The preferred pH depends upon the particular compound employed as a sequestrant. For iron ($Fe^{+3}$) sequestration, preferred pH ranges from about pH 6 to about pH 10–10.5 (i.e., below pH 11). However, for use to stabilize peroxide solutions, such as hydrogen peroxide, a pH of about 4 to about 12 is preferred.

The compounds of this invention, when added to those solutions in which sequestration is desired, may be added as solids or solutions. If it is desired to add said compounds as solutions, the compounds may be dissolved in polar solvents such as water; mixtures of water and lower alkanols of from 1 to 4 carbon atoms wherein up to about 50 percent of said mixtures is comprised of alkanol; and the like. From about 0.001 percent to about 25 percent concentration (by weight) may be used (Percent concentration [by weight]
= Weight of sequestrant×100

Weight of sequestrant + weight of solvent [if any] in which sequestrant is dissolved before being added to solution to be sequestered + weight of solution to be sequestered [prior to the time sequestrant is added]

though it is preferred to use from about 0.01 to about 5 percent concentration (by weight), and it is even more preferred to use from about 0.1 to about 3 percent concentration (by weight).

It is preferred to use said compounds as sequestrants in aqueous solutions, such as water solutions; solutions containing mixtures of water and lower alkanols of 1 to about 4 carbon atoms wherein up to about 50 percent of said mixtures is comprised of alkanol; and the like. When said compounds are added to the solutions to be sequestered, the temperatures of said solutions may be from about 0 to about 100 degrees centigrade, though it is preferred that said temperatures be from about 20 to about 70 degrees centigrade, and it is even more preferred that said solutions be at ambient temperatures.

The following examples are illustrative of the invention, and are not to be deemed limitative thereof, except to the extent specifically stated and to the extent that the appended claims are limited. Unless otherwise specified, parts are by weight and temperatures are in degrees centigrade.

EXAMPLE I

For a 3% hydrogen peroxide solution the peroxide stabilizing ability of one of the novel sequestrants, i.e., the STDAMP described obove, was evaluated as a function of concentration of the STDAMP in the cation-containing peroxide solution to be sequestered. The tests were carried out at pH 8, at 80° C., using 3 parts per million of $Cu^{+2}$ as the decomposition catalyst to be sequestered. It was found that the varying of the STDAMP concentration has a substantial and significant effect upon the peroxide stability. Peroxide stabilization increases almost exponentially as the concentration of the STDAMP is increased from about 0.025 to 0.10%, this range thereby being a preferred range at this approximate pH and at this approximate concentration of copper cations, for random concentrations of hydrogen peroxide solutions. Above a stabilizer (STDAMP) concentration of about 0.075%, the hydrogen peroxide was too stable to experimentally measure its half-life. The STDAMP at about 0.025% gave a decomposition half-life of about 100 minutes.

EXAMPLE II

Under the same conditions as described in Example I, SEDTA (described above) was evaluated at 0.10% concentration and found to give a decomposition half-life of about 100 minutes.

It is significant to note that the SEDTA required about four times as great a concentration as that of the STDAMP in order to obtain an approximately equivalent degree of stabilization, whereby the relative cost of stabilization is significantly lower by use of STDAMP as compared to the SEDTA.

EXAMPLES III–VIII

The preceding novel organophosphorus chelating agents of this invention and mixtures thereof were prepared and their metal sesquestering efficiencies evaluated and compared in Tables I and II, to values obtained for commercial sequestrants, such as trisodium nitrilotriacetate (SNTA), tetrasodium ethylenediaminetetraacetate (SEDTA), disodium iminodiacetate (SIDA), trisodium hydroxyethylethylenediaminetriacetate (SHEDTA), pentasodium diethylenetriaminepentaacetate (SDTPA), pentasodium nitrilotrimethylenephosphonate (SNTMP) and gluconic acid.

The following test procedure was used in evaluating sequestering efficiency towards $Cu^{+2}$: 0.05 Molar $CuCl_2$ was titrated dropwise with stirring into 100 grams of solution of a given pH containing 50 milligrams of dissolved sequestrant. Titration was continued, along with simultaneous pH adjustment, until a perceptible permanent haze existed in solution. Sequestering efficiency towards $Fe^{+3}$ was evaluated in the same manner as previously described except that 0.5 Molar $FeCl_3$ was titrated into 50 grams of solution containing 0.5 gram of sequestrant. Sequestering efficiency is calculated in terms of:

$$\frac{\text{Lbs. of Metal Ion Sequestered}}{100 \text{ Lbs. of Sequestrant}}$$

Compounds and compositions evaluated include:

(a) Hexasodium Tris(N,N-diacetatoaminomethyl)-Phosphine (STDAMP)

$$P\left(CH_2N\begin{matrix}CH_2COONa\\CH_2COONa\end{matrix}\right)_3$$

(b) Tris(N,N-diacetoaminomethyl)Phosphine (TDAMP)

$$P\left(CH_2-N\begin{matrix}CH_2-COOH\\CH_2-COOH\end{matrix}\right)_3$$

(c) Trisodium Tris(N-acetatoaminomethyl) Phosphine (STAMP)

$$P(CH_2\overset{H}{N}CH_2COONa)_3$$

(d) STDAMP reaction mixture (I)
(e) STDAMP reaction mixture (II)

PERCENT DISTRIBUTION (COMPOUND DESIGNATOR)

| Mixture (I) | Percent |
|---|---|
| A | 44.65 |
| B | 46.60 |
| C | 7.72 |
| D | 1.03 |

| Mixture (II) | |
|---|---|
| A | 34.80 |
| B | 49.44 |
| C | 6.53 |
| D | 9.23 |

$$A = P\left(CH_2N\begin{matrix}CH_2COONa\\CH_2COONa\end{matrix}\right)_3 \quad (STDAMP)$$

$$B = HOCH_2P\left(CH_2N\begin{matrix}CH_2COONa\\CH_2COONa\end{matrix}\right)_2 \quad (SHMBAMP)$$

$$C = (HOCH_2)_2PCH_2N\begin{matrix}CH_2COONa\\CH_2COONa\end{matrix} \quad (SBHMAMP)$$

$$D = \overset{O}{\overset{\|}{P}}(CH_2OH)_3 \quad \text{Tris(Hydroxymethyl)Phosphine Oxide (THPO)}$$

EXAMPLE III

STDAMP was prepared by the reaction of THPC (tetrakis(hydroxymethyl)phosphonium chloride) with disodium iminodiacetate (SIDA):

$$1\ (HOCH_2)_4PCl + 3HN\begin{matrix}CH_2COONa\\CH_2COONa\end{matrix} \xrightarrow{pH\ 11}$$

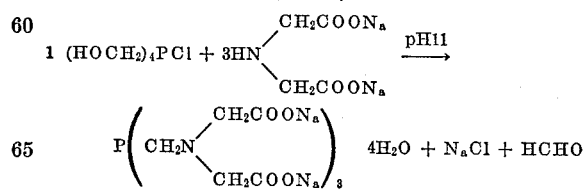

To 447 g. of aqueous solution of pH 11 containing 89.6 g. (0.459 mole) of dissolved $SIDA \cdot H_2O$ was added dropwise with stirring 61 g. of aqueous solution containing 29.92 g. (0.157 mole) of dissolved THPC. During THPC addition, the pH of the reaction solution was maintained at 11 by the simultaneous addition of 6 M NaOH. A temperature elevation of 5° C. (25–30° C.) was observed during the course of THPC addition, indicating a slightly exothermic reaction to be occurring. At the end of THPC addition, a yellow solution was present; this solution was stirred for an additional 150 minutes to ensure complete reaction. Solid product was recovered from the reaction solution by the addition of acetone to form a two layer system (an upper organic layer and a lower aqueous, oily layer). The layers were separated by decantation and additional acetone added to the lower layer (followed by sucesssive decantation) until a viscous white mass was present. This material was vacuum dried at 70° C. for 65 hours to yield a pale yellow free flowing powder. Yield: 90.0 g. (93% of theoretical).

*Analysis.*—Calc'd for

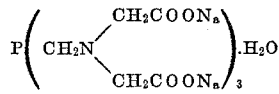

(percent): C, 29.10; N, 6.79; H, 3.26; Na, 22.30. Found (percent): C, 29.12; N, 6.75; H, 3.26; Na, 22.93.

The formation of STDAMP was further supported by infrared and nuclear magnetic resonance spectroscopic data, along with chemical test data.

EXAMPLE IV

TDAMP was prepared by treating an aqueous solution of STDAMP with 6 equivalents of HCl and recovering the resulting protonated product by the same technique as described in Example III. The formation of TDAMP was supported by infrared and nuclear magnetic resonance spectroscopic data, along with chemical test data.

EXAMPLE V

STAMP was prepared by the reaction of THPC with sodium glycinate (SGY):

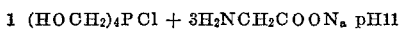

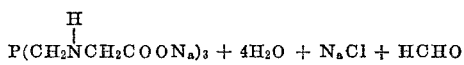

The reaction was carried out in a manner analogous to that described between THPC and SIDA in the formation of STDAMP: to 172 g. of aqueous solution of pH 11 containing 34.45 g. (0.459 mole) of dissolved glycine was added dropwise with stirring 61 g. of aqueous solution containing 29.92 g. (0.157 mole) of dissolved THPC. During THPC addition, the pH of this reaction solution was maintained at 11 by addition of 6 M NaOH. A temperature elevation of 14° C. (25-39° C.) was observed during the course of THPC addition, indicating a somewhat exothermic reaction to be occurring. At the end of THPC addition, a yellow-orange solution was present; this solution was stirred for an additional 45 minutes to ensure complete reaction. Solid product was recovered from the reaction solution by the addition of acetone to form a two layer system (an upper organic layer and a lower aqueous, oily layer). The layers were separated by decantation and additional acetone added to the lower layer (followed by successive decantation) until a solid granular white mass was present. This material was vacuum dried over $P_2O_5$ at 25° C. to yield a free-flowing white powder. Yield: 60.7 g. (100% of theoretical).

*Analysis.*—Calc'd for

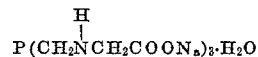

(percent): P, 8.18; C, 28.50; H, 4.52; Na, 18.20. Found (percent): P, 7.50; C, 28.99; H, 4.42; Na, 18.22.

The formation of STAMP was further supported by infrared and nuclear magnetic resonance spectroscopic data, along with chemical test data.

EXAMPLE VI

STDAMP reaction mixtures (I) and (II) were prepared by reacting THPC with SIDA in stoichiometric mole ratios of 1:2 and 1:1, respectively, according to the procedure outlined in Example III in the preparation of reaction mixture (II), however, reagent addition was the reverse of that cited in Example III. The compositions of STDAMP reaction mixtures (I) and (II) were obtained by $^{31}P$ and $^{1}H$ nuclear magnetic resonance spectroscopic analysis.

EXAMPLE VII

The $Cu^{+2}$ sequestering efficiencies of the new organophosphorus chelating agents are compared to measured efficiencies of several commercial sequestrants in Table I:

TABLE I.—$Cu^{+2}$ SEQUESTERING EFFICIENCY

[A designation of 1.00 represents a value of 20.27 lbs of $Cu^{+2}$ sequestered per 100 lbs. of sequestrant]

| Sequestrant | Sequestering efficiency | | | | | | |
|---|---|---|---|---|---|---|---|
| | pH 7 | pH 8 | pH 9 | pH 10 | pH 11 | pH 12 | pH 13 |
| STDAMP | 1.63 | 1.75 | 1.53 | 1.19 | 1.13 | 1.01 | 0.91 |
| Mixture (I) | | 1.62 | 1.56 | 1.42 | 1.10 | | |
| Mixture (II) | | 1.27 | 1.19 | 1.11 | 1.04 | | |
| TDAMP | | 2.11 | 1.72 | 1.52 | 1.43 | | |
| STAMP | | 1.26 | 1.63 | 1.81 | 1.97 | 1.85 | 1.40 |
| SEDTA | | 1.02 | 1.08 | 1.00 | 0.97 | | |
| SNTA | | 1.50 | 1.42 | 1.45 | 1.43 | | |
| SIDA | | 2.09 | 1.70 | 1.42 | 1.33 | | |
| SNTMP | | 0.74 | 0.84 | 0.76 | 0.79 | | |
| SDTPA | 1.31 | 1.70 | 1.58 | 1.07 | 0.79 | 0.70 | 0.39 |

EXAMPLE VIII

The $Fe^{+3}$ sequestering efficiencies of the new organophosphorus chelating agents are compared to measured efficiencies of several commercial sequestrants in Table II:

TABLE II.—$Fe^{+3}$ SEQUESTERING EFFICIENCY

[A designation of 1.00 represents a value of 7.1 lbs. of $Fe^{+3}$ sequestered per 100 lbs. of sequestrant]

| Sequestrant | Sequestering efficiency | | | | | |
|---|---|---|---|---|---|---|
| | pH 7 | pH 8 | pH 9 | pH 10 | pH 11 | pH 12 |
| STDAMP | 1.89 | 1.69 | 1.58 | 1.58 | 0.83 | 0.39 |
| Mixture (I) | 3.19 | 2.60 | 2.32 | 2.28 | 1.38 | 0.87 |
| Mixture (II) | 5.00 | 5.24 | 4.88 | 4.53 | 3.15 | 2.96 |
| STAMP | 2.92 | 2.92 | 2.72 | 2.17 | 1.66 | 0.51 |
| SEDTA | 0.91 | 1.43 | 1.28 | 1.00 | 0.45 | 0.09 |
| SNTA | 1.08 | 0.99 | 0.82 | 0.68 | 0.29 | 0.09 |
| SIDA | 0.71 | 0.95 | 0 95 | 0.95 | 0.47 | 0.16 |
| $THPO_3$ | | 0.08 | 0.36 | 3.61 | 10.1 | 19.9 |
| Gluconic acid | 5.98 | 6.63 | 6.70 | 6.78 | 4.53 | 3.17 |
| SHEDTA | 2.20 | 2.55 | 2.55 | 2.36 | 1.50 | 0.79 |
| SNTMP | | | | 2.01 | 1.90 | 0.96 |
| SDTPA | 1.26 | 1.26 | 1.63 | 1.88 | 0.86 | 0.45 |

The scope of this invention includes all equivalents and modifications thereof which would be obvious to a person skilled in the field of this invention, and the invention is limited solely to the extent that limitations appear in the appended claims.

I claim:
1. A compound of the formula

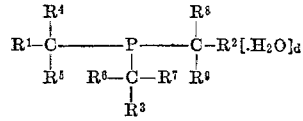

wherein $d$ is from 0 to 3;

$R^1$, $R^2$, and $R^3$ are independently selected from the group consisting of hydroxy and an amino carboxylic group of the formula:

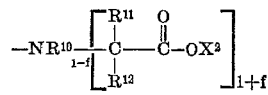

wherein $f$ is 0 or 1;

$X^2$ is independently selected from the group consisting of hydrogen, ammonium and an alkali metal;

$R^4$–$R^9$ are independently selected from the group consisting of hydrogen, hydroxy and lower alkyl;

$R^{10}$–$R^{12}$ are independently selected from the group consisting of hydrogen and lower alkyl;

provided at least one of said $R^1$, $R^2$ or $R^3$ is said amino carboxylic group.

2. The compound of claim 1 wherein $R^1$ is hydroxyl.
3. The compound of claim 1 wherein $R^2$ is hydroxyl.
4. The compound of claim 1 wherein $R^4$–$R^{12}$ are each hydrogen.
5. A compound according to claim 1, in which $R^1$, $R^2$ and $R^3$ are each said aminocarboxylic group.
6. A compound according to claim 5, in which $X^2$ is selected from the group consisting of sodium and potassium.
7. Hexasodium tris(N,N-diacetatoaminomethyl) phosphine.
8. Trisodium tris(N-acetatoaminomethyl)phosphine.
9. Tetrasodium hydroxymethyl bis(N,N-diacetatoaminomethyl)phosphine.
10. Disodium bis(hydroxymethyl)N,N-diacetatoaminomethyl phosphine.
11. A process comprising reacting a tetrakis(hydroxyloweralkyl)phosphonium halide with an amino carboxylic group of the formula:

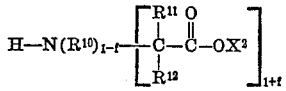

in the presence of an alkali metal compound at a pH from about 10 to about 12; in which $R^{10}$–$R^{12}$ are independently selected from the group consisting of hydrogen and lower alkyl;

$f$ ranges from 0 to 1;

$X^2$ is independently selected from the group consisting of hydrogen, ammonium and an alkali metal; and wherein said halide is chloride or a bromide.

12. The process of claim 11 in which the pH ranges from about 10.5 to about 11.5; said tetrakis(hydroxy lower alkyl) phosphonium halide is in an aqueous solution and is added to an alkaline solution of said amino carboxylic group.

References Cited
UNITED STATES PATENTS

| | | | |
|---|---|---|---|
| 3,455,675 | 7/1969 | Irani | 260—502.5 |
| 3,394,172 | 7/1968 | Schiefer | 260—502 |
| 3,288,846 | 11/1966 | Irani | 260—502.5 |

LORRAINE A. WEINBERGER, Primary Examiner

J. L. DAVISON, Assistant Examiner

U.S. Cl. X.R.

252—152, 175; 23—207.5

PO-1050
(5/69)

UNITED STATES PATENT OFFICE
CERTIFICATE OF CORRECTION

Patent No. 3,578,708      Dated      May 11, 1971

Inventor(s)      Ronald H. Carlson

It is certified that error appears in the above-identified patent and that said Letters Patent are hereby corrected as shown below:

Column 3, line 72, "comletely" should read ---completely---.

Column 6, line 65, "$4H_2O + NaCl + HCHO$" should read --- $+4H_2O + NaCl + HCHO$---.

Column 8, line 22, "SNTA (under pH 11) 1.43" correct to read ---SNTA (under pH 11) 1.44---; line 41, "Gluconic Acid (under pH 12) 3.17" correct to read ---Gluconic Acid (under pH 12) 3.16---; line 43, "SNTMP (under pH 12) 0.96" correct to read ---SNTMP (under pH 12) 0.95---; line 44, "SDTPA (under pH 12) 0.45" correct to read ---SDTPA (under pH 12) 0.49---.

Signed and sealed this 25th day of April 1972.

(SEAL)
Attest:

EDWARD M. FLETCHER, JR.
Attesting Officer

ROBERT GOTTSCHALK
Commissioner of Patents